US012807513B2

(12) United States Patent
Teufl et al.

(10) Patent No.: US 12,807,513 B2
(45) Date of Patent: Nov. 24, 2026

(54) PROCESS FOR MAKING MANGANESE-RICH CATHODE ACTIVE MATERIALS

(71) Applicants: BASF SE, Ludwigshafen (DE); The Board of Trustees of the Leland Stanford Junior University, Stanford, CA (US)

(72) Inventors: Tobias Maximillian Teufl, Poing (DE); Jordan K. Lampert, Pensacola, FL (US); Heino Sommer, Ludwigshafen (DE); Kipil Lim, Stanford, CA (US); Peter M. Csernica, Stanford, CA (US); William E. Gent, Stanford, CA (US); William C. Chueh, Stanford, CA (US); Grace Busse, Stanford, CA (US)

(73) Assignees: BASF SE, Ludwigshafen am Rhein (DE); THE BOARD OF TRUSTEES OF THE LELAND STANFORD JUNIOR UNIVERISTY, Stanford, CA (US)

( * ) Notice: Subject to any disclaimer, the term of this patent is extended or adjusted under 35 U.S.C. 154(b) by 933 days.

(21) Appl. No.: 17/907,561

(22) PCT Filed: Apr. 1, 2021

(86) PCT No.: PCT/EP2021/058607

§ 371 (c)(1),
(2) Date: Sep. 28, 2022

(87) PCT Pub. No.: WO2021/209272

PCT Pub. Date: Oct. 21, 2021

(65) Prior Publication Data

US 2023/0143043 A1 May 11, 2023

(30) Foreign Application Priority Data

Apr. 17, 2020 (EP) .................................... 20170035

(51) Int. Cl.

| | |
|---|---|
| ***C01G 53/502*** | (2025.01) |
| ***H01M 4/02*** | (2006.01) |
| ***H01M 4/04*** | (2006.01) |
| ***H01M 4/485*** | (2010.01) |
| ***H01M 4/505*** | (2010.01) |
| ***H01M 4/52*** | (2010.01) |

(Continued)

(52) U.S. Cl.

CPC ........ *C01G 53/502* (2025.01); *H01M 4/0409* (2013.01); *H01M 4/0471* (2013.01); *H01M 4/485* (2013.01); *H01M 4/505* (2013.01); *H01M 4/52* (2013.01); *H01M 4/625* (2013.01); *H01M 10/0525* (2013.01); *H01M 2004/028* (2013.01)

(58) Field of Classification Search

CPC .. H01M 4/505; H01M 4/0409; H01M 4/0471; H01M 4/485; H01M 4/52; H01M 4/625; H01M 10/0525; H01M 2004/028; H01M 10/052; H01M 4/525; C01G 53/82; C01G 53/50; Y02E 60/10; C01P 2002/52; C01P 2004/03; C01P 2004/51; C01P 2004/61; C01P 2006/11; C01P 2006/12; C01P 2006/40

See application file for complete search history.

(56) References Cited

U.S. PATENT DOCUMENTS

| | | | | |
|---|---|---|---|---|
| 2012/0301390 A1* | 11/2012 | Kawakami ............ | H01M 4/131 | 423/594.2 |
| 2015/0056511 A1* | 2/2015 | Takamatsu .......... | H01M 4/1315 | 429/231.1 |
| 2017/0018805 A1* | 1/2017 | Yoshida ............ | H01M 10/0567 | |

(Continued)

FOREIGN PATENT DOCUMENTS

| | | |
|---|---|---|
| CN | 109 451 926 A | 3/2019 |
| CN | 110 931 738 A | 3/2020 |

(Continued)

OTHER PUBLICATIONS

Ashcroft, et al., "Study of the preparation conditions for NiMn2O4 grown from hydroxide precursors", Journal of the European Ceramic Society, vol. 26, Issue 6, 2006, pp. 901-908.
Chen, et al., "Hierarchical Li1.2Ni0.2Mn0.6O2 Nanoplates with Exposed {010} Planes as High-Performance Cathode Material for Lithium-Ion Batteries", Advanced Materials, vol. 26, Issue 39, Sep. 2, 2014, pp. 6756-6760.
European Search Report for EP Patent Application No. 20170035.8, Issued on Sep. 14, 2020, 5 pages.
International Seach Report dated Jul. 19, 2021, PCT/EP2021/058607.
Mushang Zhou et al., "Effect of Presintering Atmosphere on Structure and Electrochemical . . . ," Chemistryselect, vol. 5, No. 8, Feb. 28, 2020, pp. 2535-2544.

(Continued)

*Primary Examiner* — Daniel S Gatewood
(74) *Attorney, Agent, or Firm* — Armstrong Teasdale LLP

(57) ABSTRACT

Process for making a mixed oxide according to the formula $Li_{1+x}TM_{1-x}O_2$ wherein x is in the range of from 0.1 to 0.2 and TM is a combination of elements according to general formula (I) $(Ni_aCo_bMn_c)_{1-d}M^1{}_d$ (I) wherein a is in the range of from 0.30 to 0.38, b being in the range of from zero to 0.05, c being in the range of from 0.60 to 0.70, and d being in the range of from zero to 0.05, $M^1$ is selected from Al, Ti, Zr, W, Mo, Nb, Ta, Mg and combinations of at least two of the foregoing, a+b+c=1, said process comprising the following steps: (a) providing a particulate hydroxide, oxide or oxyhydroxide of manganese, nickel, and, optionally, at least one of Co and $M^1$, (b) adding a source of lithium, (c) calcining the mixture obtained from step (b) thermally under an atmosphere comprising 0.05 to 5 vol.-% of oxygen at a maximum temperature the range of from 650 to 1000 °C.

5 Claims, No Drawings

(51) Int. Cl.
*H01M 4/62* (2006.01)
*H01M 10/0525* (2010.01)

(56) References Cited

U.S. PATENT DOCUMENTS

| | | | | |
|---|---|---|---|---|
| 2018/0145318 | A1 | 5/2018 | Endo et al. | |
| 2020/0144617 | A1* | 5/2020 | Kern | C01G 53/42 |
| 2020/0203719 | A1 | 6/2020 | Volkov et al. | |

FOREIGN PATENT DOCUMENTS

| | | | | | |
|---|---|---|---|---|---|
| EP | 3486980 | A1 | | 5/2019 | |
| JP | 201222896 | A | | 2/2012 | |
| JP | 2019-89708 | A | † | 6/2019 | |
| WO | 2015108163 | A1 | | 7/2015 | |
| WO | WO-2018215254 | A1 | * | 11/2018 | C01G 53/42 |

OTHER PUBLICATIONS

Ruhul Amin et al., "Part I: Electronic and ionic transport properties of the ordered and disordered . . . ," Journal of Power Sources, vol. 348, Mar. 6, 2017, pp. 311-317.

Liang Rui et al., "Influence of oxygen percentage in calcination atmosphere . . . ," Ceramics International, Elsevier,Amsterdam, vol. 45, No. 15, Jun. 14, 2019, p. 18965-18971.

Jing Yuan et al., "Influence of calcination atmosphere on structure and electrochemical . . . ," Electrochimica ACTA, vol. 230, Mar. 1, 2017, pp. 116-122.

WO2016/190419 A1, published Dec. 1, 2016, Daisuke Endo et al.†

* cited by examiner
† cited by third party

PROCESS FOR MAKING MANGANESE-RICH CATHODE ACTIVE MATERIALS

This application is a national stage filing under 35 U.S.C. § 371 of International Application No. PCT/EP2021/058607, filed on Apr. 1, 2021, and claims priority to EP Application Serial No. 20170035.8, filed Apr. 17, 2020; the disclosure of each of these applications are incorporated herein by reference in their entirety.

The present invention is directed towards a process for making a mixed oxide according to the formula $Li_{1+x}TM_{1-x}O_2$ wherein x is in the range of from 0.1 to 0.2 and TM is a combination of elements according to general formula (I)

$$(Ni_aCo_bMn_c)_{1-d}M^1_d \quad (I)$$

wherein a is in the range of from 0.30 to 0.38, b being in the range of from zero to 0.05, c being in the range of from 0.60 to 0.70, and d being in the range of from zero to 0.05, $M^1$ is selected from Al, Ti, Zr, W, Mo, Nb, Ta, Mg and combinations of at least two of the foregoing, $$a+b+c=1,$$

said process comprising the following steps:

(a) providing a particulate hydroxide, oxide or oxyhydroxide of manganese, nickel, and, optionally, at least one of Co and $M^1$, (b) adding a source of lithium, (c) calcining the mixture obtained from step (b) under an atmosphere comprising 0.05 to 5 vol.-% of oxygen at a maximum temperature the range of from 650 to 1000 °C.

Lithiated transition metal oxides are currently being used as electrode active materials for lithium-ion batteries. Extensive research and developmental work has been performed in the past years to improve properties like charge density, specific energy, but also other properties like the reduced cycle life and capacity loss that may adversely affect the lifetime or applicability of a lithium-ion battery. Additional effort has been made to improve manufacturing methods.

Many electrode active materials discussed today are of the type of lithiated nickel-cobalt-manganese oxide ("NCM materials") or lithiated nickel-cobalt-aluminum oxide ("NCA materials").

In a typical process for making cathode materials for lithium-ion batteries, first a so-called precursor is being formed by co-precipitating the transition metals as carbonates, oxides or preferably as hydroxides that may or may not be basic. The precursor is then mixed with a lithium salt such as, but not limited to LiOH, $Li_2O$ or—especially—$Li_2CO_3$—and calcined (fired) at high temperatures. Lithium salt(s) can be employed as hydrate(s) or in dehydrated form. The calcination—or firing—generally also referred to as thermal treatment or heat treatment of the precursor—is usually carried out at temperatures in the range of from 600 to 1000 °C. During the thermal treatment a solid state reaction takes place, and the electrode active material is formed. In cases hydroxides or carbonates are used as precursors the solid state reaction follows a removal of water or carbon dioxide. The thermal treatment is performed in the heating zone of an oven or kiln.

Extensive research has been performed on improvement of various properties of cathode active materials, such as energy density, charge-discharge performance such as capacity fading, and the like. However, many cathode active materials suffer from limited cycle life and voltage fade. This applies particularly to many Mn-rich cathode active materials.

In EP 3 486 980, specific high-manganese materials with a high energy density retention rate are disclosed. However, the cathode active materials disclosed suffer from a limited energy density as such.

It was therefore an objective of the present invention to provide a process for making cathode active materials with both a high energy density and a high energy density retention rate. It was further an objective to provide cathode active materials with both a high energy density and a high energy density retention rate. It was further an objective to provide applications of cathode active materials with both a high energy density and a high energy density retention rate.

Accordingly, the process as defined at the outset has been found, hereinafter also referred to as "inventive process". The inventive process comprises the following steps:

(a) providing a particulate hydroxide, oxide or oxyhydroxide of manganese, nickel, and, optionally, at least one element of Co and $M^1$, wherein $M^1$ is selected from Al, Ti, Zr, W, Mo, Mg, B and combinations of at least two of the foregoing, (b) adding a source of lithium, (c) calcining the mixture obtained from step (b) under an atmosphere comprising of from 0.05 to 5 vol.-% of oxygen at a maximum temperature the range of from 650 to 1000 °C.

The inventive process comprises three steps, (a), (b), (c), in the context of the present invention also referred to as step (a) and step (b) and step (c), respectively. The various steps will be described in more detail below.

In step (a), a particulate hydroxide, oxide or oxyhydroxide of manganese, nickel, and, optionally, at least one element of Co and $M^1$, is provided, hereinafter also referred to as "precursor". Said precursor may be obtained by co-precipitation of a hydroxide of manganese, nickel, and, optionally, at least one element of Co and $M^1$ with alkali metal hydroxide.

The metal part of the precursor preferably has the composition according to formula 1

$$(Ni_aCo_bMn_c)_{1-d}M^1_d \quad (I)$$

wherein a is in the range of from 0.30 to 0.38, b being in the range of from zero to 0.05, c being in the range of from 0.60 to 0.70, and d being in the range of from zero to 0.05, and $$a+b+c=1.$$

Preferably, b and d are both zero.

In one embodiment of the present invention, the precursor has a mean particle diameter D50 in the range from 2 to 20 μm, preferably 6 to 15 μm. The mean particle diameter D50 in the context of the present invention refers to the median of the volume-based particle diameter, as can be determined by light scattering, for example.

In one embodiment of the present invention, the width of the particle diameter distribution of the precursor is at least 0.61, for example 0.61 to 2, preferably 0.65 to 1.5, expressed as [d90-d10)/(d50) diameter].

In one embodiment of the present invention, $M^1$ includes Mg in the range of from 0.1 to 2.5 mol-% per sum of metals in said precursor.

In one embodiment of the present invention, said precursor has 0.01 to 10 mol % and preferably 0.3 to 5 mol % of anions other than hydroxide or carbonate ions, based on the total number of anions, for example sulfate.

In one embodiment of the present invention, the precursor is made by combining an aqueous solution of water-soluble salts of manganese, nickel, and, optionally cobalt and $M^1$, solution (α), with an aqueous solution of alkali metal hydroxide, solution (β).

The term water-soluble salts of manganese and nickel or of metals other than nickel and manganese refers to salts that exhibit a solubility in distilled water at 25 °C of 25 g/l or more, the amount of salt being determined under omission of crystal water and of water stemming from aquo complexes. Water-soluble salts of nickel, cobalt and manganese may preferably be the respective water-soluble salts of $Ni^{2+}$ and $Mn^{2+}$. Examples of water-soluble salts of nickel and manganese are the sulfates, the nitrates, the acetates and the halides, especially chlorides. Preferred are nitrates and sulfates, of which the sulfates are more preferred.

In one embodiment of the present invention, the concentration of solution (a) can be selected within wide ranges. Preferably, the total concentration is selected such that they are within the range of, in total, 1 to 1.8 mol of the transition metals/kg of solution, more preferably 1.5 to 1.7 mol of the transition metals/kg of solution. "The transition metal salts" used herein refers to the water-soluble salts of nickel and manganese, and as far as applicable, cobalt and $M^1$, and may include salts of other metals, for example of magnesium or aluminum or transition metals other than nickel and manganese.

Another example of water-soluble salts is alum, $KAl(SO_4)_2$.

Solution (α) may have a pH value in the range of from 2 to 5. In embodiments wherein higher pH values are desired, ammonia may be added to solution (α). However, it is preferred to not add ammonia.

Solution (β) is an aqueous solution of alkali metal hydroxide. An example of alkali metal hydroxides is lithium hydroxide, preferred is potassium hydroxide and a combination of sodium and potassium hydroxide, and even more preferred is sodium hydroxide.

Solution (β) may contain some amount of carbonate, e.g., by aging of the solution or the respective alkali metal hydroxide.

The pH value of solution (β) is preferably 13 or higher, for example 14.5.

It is preferred to not use ammonia during the step of combining solutions (α) and (β).

In one embodiment of the present invention, the pH value at the end of the step of combining solutions (α) and (β) is in the range from 8 to 12, preferably 10.5 to 12.0, and more preferably 11.0 to 12.0, each measured in the mother liquor at 23 °C.

In one embodiment of the present invention, the co-precipitation is performed at temperatures in the range from 10 to 85 °C, preferably at temperatures in the range from 20 to 60 °C.

In one embodiment of the present invention, the co-precipitation is performed under inert gas, for example a noble gas such as argon, or under $N_2$.

In one embodiment of the present invention, a slight excess of hydroxide is applied, for example 0.1 to 10 mole-%.

By combination of solutions (α) and (β) a slurry is formed. The solids may be isolated by solid-liquid-separation methods, for example decantation, filtration, and by the means of a centrifuge, filtration being preferred. A precursor is obtained. Then, the precursor is dried, for example under air at a temperature in the range of from 100 to 120 °C. Preferably, the residual moisture content of the precursor is 1% by weight or below, for example 0.01 to 0.5% by weight.

In step (b), a source of lithium is added to the precursor. To perform step (b) of the inventive process, the procedure may be, for example, to mix precursor with at least one lithium compound selected from $Li_2O$, LiOH, $Li_2O_2$, and $Li_2CO_3$, water of crystallization being neglected in the context of the present invention. Preferred source of lithium is $Li_2CO_3$.

To perform step (b), the amounts of precursor and source of lithium are selected so as to obtain the stoichiometry of the desired inventive material. Preferably, precursor and source of lithium compound(s) are selected such that the molar ratio of lithium to the sum of all transition metals and any M is in the range from 1.275:1 to 1.42:1, preferably 1.30:1 to 1.38:1, even more preferably 1.32:1 to 1.36:1.

Step (b) may be performed, e.g., in a plough-share mixer, in a ball mill, or a tumble mixer. For laboratory scale experiments, roller mills, planetary ball mills, and mortars with pestle may be applied as well.

To perform step (c) of the inventive process, the mixture obtained according to step (c) is calcined at a temperature in the range of from 650 to 1000 °C, preferably 875 to 950 °C. The temperature refers to the maximum temperature.

Step (c) of the inventive process can be performed in a furnace, for example in a rotary tube furnace, in a muffle furnace, in a pendulum furnace, in a roller hearth furnace or in a push-through furnace. Combinations of two or more of the aforementioned furnaces are possible as well.

Step (c) of the inventive process can be performed over a period of 30 minutes to 24 hours, preferably 3 to 12 hours. Step (c) can be effected at a temperature level, or a temperature profile can be run.

In accordance with the present invention, step (c) is being performed under an atmosphere comprising of from 0.05 to 5 vol.-% of oxygen, preferably 0.1 to 2 vol.-% of oxygen. Preferably, the remainder of the atmosphere in step (c) is a non-oxidizing gas selected from nitrogen and noble gasses and combinations thereof. Preferred noble gas is argon. However, the remainder of the atmosphere may contain humidity and/or $CO_2$ evolved during the reaction as well in addition to non-oxidizing gas selected from nitrogen and noble gasses.

In one embodiment of the present invention, between steps (b) and (c) at least one precalcining step (c*) is being performed. Step (c*) comprises heating the mixture obtained in step (b) at a temperature in the range of from 300 to 700 °C for a period of 2 to 24 hours.

During the temperature changes, a heating rate of 1 K/min up to 10 K/min can be obtained, preferred is 2 to 5 K/min.

After step (c), it is preferred to cool down the material obtained to ambient temperature.

By carrying out the inventive process, electrode active materials are obtained with excellent electrochemical properties.

The inventive process may comprise an additional step (d) subsequent to step (c), and wherein said step (d) is selected from coating steps and wet treatment steps. Further additional—optional—are sieving steps after step (c).

In one embodiment of the present invention, the inventive process additionally comprises a step (d) subsequent to step (c), and wherein said step (d) is selected from coating steps and wet treatment steps. Examples of coating steps are dry coating steps wherein a powdery oxide or hydroxide or oxyhydroxide of a metal is added, for example of aluminum or titan or zirconium, followed by thermal treatment similar to step (c). Further examples of coating steps are atomic layer deposition methods, for example alternating exposure to an alkyl compound of a metal and to moisture. Further examples of coating steps are methods wherein solutions of a metal compound such as an alcoholate are combined cathode active material, and metal oxides or hydroxides are deposited on the outer surface of the cathode active materials.

Examples of wet treatments are washing the cathode active material with water, followed by drying and, optionally, a thermal treatment such as in step (c).

A further aspect of the present invention is related to particulate materials as defined at the outset has been found, hereinafter also defined as inventive material or as material according to the current invention. The inventive material shall be described in more detail below.

Inventive material is of the composition $Li_{1+x}TM_{1-x}O_2$ wherein x is in the range of from 0.1 to 0.2 and TM is a combination of elements according to general formula (I)

$$(Ni_aCo_bMn_c)_{1-d}M^1_d \quad (I)$$

wherein a is in the range of from 0.30 to 0.38, b being in the range of from zero to 0.05, preferably b is zero.

c being in the range of from 0.60 to 0.70, and d being in the range of from zero to 0.05, $$a+b+c=1,$$

$M^1$ is selected from Al, Ti, Zr, W, Mo, Mg, B, and combinations of at least two of the foregoing, with Al being preferred, wherein said particulate material has a pressed density in the range of from 2.75 to 3.1 g/cm$^3$, preferably from 2.80 to 3.10 g/cm$^3$, determined at a pressure of 250 MPa.

inventive materials have an average particle diameter D50 in the range of from 2 to 20 μm, preferably from 5 to 16 μm. The average particle diameter may be determined, e. g., by light scattering or LASER diffraction or electroacoustic spectroscopy. The particles are usually composed of agglomerates from primary particles, and the above particle diameter refers to the secondary particle diameter.

In one embodiment of the present invention inventive electrode active materials have a surface (BET) in the range of from 0.7 to 3.8 m$^2$/g, determined according to DIN-ISO 9277:2003-05, preferred are 1.5 to 3.8.

Some metals are ubiquitous such as sodium, calcium or zinc and traces of them virtually present everywhere, but such traces will not be taken into account in the description of the present invention. Traces in this context will mean amounts of 0.05 mol-% or less, referring to the total metal content TM.

$M^1$ may be dispersed homogeneously or unevenly in particles of inventive material. Preferably, $M^1$ is distributed unevenly in particles of inventive material, even more preferably as a gradient, with the concentration of $M^1$ in the outer shell being higher than in the center of the particles.

In one embodiment of the present invention, the inventive material is comprised of spherical particles, that are particles have a spherical shape. Spherical particles shall include not just those which are exactly spherical but also those particles in which the maximum and minimum diameter of at least 90% (number average) of a representative sample differ by not more than 10%.

In one embodiment of the present invention, the inventive material is comprised of secondary particles that are agglomerates of primary particles. Preferably, inventive material is comprised of spherical secondary particles that are agglomerates of primary particles. Even more preferably, inventive material is comprised of spherical secondary particles that are agglomerates of platelet primary particles.

In one embodiment of the present invention, said primary particles of inventive material have an average diameter in the range from 1 to 2000 nm, preferably from 10 to 1000 nm, particularly preferably from 50 to 500 nm. The average primary particle diameter can, for example, be determined by SEM or TEM. SEM is an abbreviation of scanning electron microscopy, TEM is an abbreviation of transmission electron microscopy.

In one embodiment of the present invention, the volumetric energy density (VED) is in the range of from 2,750 to 3,100 W·h/l. The VED is defined as follows: VED=1$^{st}$ cycle discharge capacity×average voltage×pressed density.

In one embodiment of the present invention, inventive material has a monomodal particle diameter distribution. In an alternative embodiment, inventive material has a bimodal particle diameter distribution, for example with a maximum in the range of from 3 to 6 μm and another maximum in the range of from 9 to 12 μm.

In one embedment of the present invention, the pressed density of inventive material is in the range of from 2.75 to 3.1 g/cm$^3$, determined at a pressure of 250 MPa, preferred are 2.85 to 3.10 g/cm$^3$.

In one embodiment of the present invention, inventive material has a tap density in the range of from 1.20 to 1.80 g/cm$^3$, determined after tapping 2,000 times in a graduated cylinder.

Inventive materials are excellently suited as cathode active materials, especially since they display both a high energy density and a high energy density retention rate.

A further aspect of the present invention are electrodes comprising at least one inventive cathode active material. They are particularly useful for lithium ion batteries. Lithium ion batteries comprising at least one electrode according to the present invention exhibit a very good discharge and cycling behavior, and they show good safety behavior.

In one embodiment of the present invention, inventive cathodes contain (A) at least one inventive material, as described above, (B) carbon in an electrically conductive state, and (C) a binder, (D) a current collector.

In a preferred embodiment of the present invention, inventive cathodes contain (A) 80 to 99% by weight inventive material, (B) 0.5 to 19.5% by weight of carbon, (C) 0.5 to 9.5% by weight of binder material, percentages referring to the sum of (A), (B) and (C).

Cathodes according to the present invention contain carbon in electrically conductive modification, in brief also referred to as carbon (B). Carbon (B) can be selected from soot, active carbon, carbon nanotubes, graphene, and graphite. Carbon (B) can be added as such during preparation of electrode materials according to the invention.

Electrodes according to the present invention can comprise further components. They can comprise a current collector (D), such as, but not limited to, an aluminum foil. They further comprise a binder material (C), hereinafter also referred to as binder (C). Current collector (D) is not further described here.

Suitable binders (C) are preferably selected from organic (co)polymers. Suitable (co)polymers, i.e. homopolymers or copolymers, can be selected, for example, from (co)polymers obtainable by anionic, catalytic or free-radical (co) polymerization, especially from polyethylene, polyacrylonitrile, polybutadiene, polystyrene, and copolymers of at least two comonomers selected from ethylene, propylene, styrene, (meth)acrylonitrile and 1,3-butadiene. Polypropylene is also suitable. Polyisoprene and polyacrylates are additionally suitable. Particular preference is given to polyacrylonitrile.

In the context of the present invention, polyacrylonitrile is understood to mean not only polyacrylonitrile homopolymers but also copolymers of acrylonitrile with 1,3-butadiene or styrene. Preference is given to polyacrylonitrile homopolymers.

In the context of the present invention, polyethylene is not only understood to mean homopolyethylene, but also copolymers of ethylene which comprise at least 50 mol % of copolymerized ethylene and up to 50 mol % of at least one further comonomer, for example α-olefins such as propylene, butylene (1-butene), 1-hexene, 1-octene, 1-decene, 1-dodecene, 1-pentene, and also isobutene, vinylaromatics, for example styrene, and also (meth)acrylic acid, vinyl acetate, vinyl propionate, $C_1$-$C_{10}$-alkyl esters of (meth) acrylic acid, especially methyl acrylate, methyl methacrylate, ethyl acrylate, ethyl methacrylate, n-butyl acrylate, 2-ethylhexyl acrylate, n-butyl methacrylate, 2-ethylhexyl methacrylate, and also maleic acid, maleic anhydride and itaconic anhydride. Polyethylene may be HDPE or LDPE.

In the context of the present invention, polypropylene is not only understood to mean homopolypropylene, but also copolymers of propylene which comprise at least 50 mol % of copolymerized propylene and up to 50 mol % of at least one further comonomer, for example ethylene and α-olefins such as butylene, 1-hexene, 1-octene, 1-decene, 1-dodecene and 1-pentene. Polypropylene is preferably isotactic or essentially isotactic polypropylene.

In the context of the present invention, polystyrene is not only understood to mean homopolymers of styrene, but also copolymers with acrylonitrile, 1,3-butadiene, (meth)acrylic acid, $C_1$-$C_{10}$-alkyl esters of (meth)acrylic acid, divinylbenzene, especially 1,3-divinylbenzene, 1,2-diphenylethylene and α-methylstyrene.

Another preferred binder (C) is polybutadiene.

Other suitable binders (C) are selected from polyethylene oxide (PEO), cellulose, carboxy-methylcellulose, polyimides and polyvinyl alcohol.

In one embodiment of the present invention, binder (C) is selected from those (co)polymers which have an average molecular weight M, in the range from 50,000 to 1,000,000 g/mol, preferably to 500,000 g/mol.

Binder (C) may be cross-linked or non-cross-linked (co) polymers.

In a particularly preferred embodiment of the present invention, binder (C) is selected from halogenated (co) polymers, especially from fluorinated (co)polymers. Halogenated or fluorinated (co)polymers are understood to mean those (co)polymers which comprise at least one (co)polymerized (co)monomer which has at least one halogen atom or at least one fluorine atom per molecule, more preferably at least two halogen atoms or at least two fluorine atoms per molecule. Examples are polyvinyl chloride, polyvinylidene chloride, polytetrafluoroethylene, polyvinylidene fluoride (PVdF), tetrafluoroethylene-hexafluoropropylene copolymers, vinylidene fluoride-hexafluoropropylene copolymers (PVdF-HFP), vinylidene fluoride-tetrafluoroethylene copolymers, perfluoroalkyl vinyl ether copolymers, ethylene-tetrafluoroethylene copolymers, vinylidene fluoride-chlorotrifluoroethylene copolymers and ethylene-chlorofluoroethylene copolymers.

Suitable binders (C) are especially polyvinyl alcohol and halogenated (co)polymers, for example polyvinyl chloride or polyvinylidene chloride, especially fluorinated (co)polymers such as polyvinyl fluoride and especially polyvinylidene fluoride and polytetrafluoroethylene.

Inventive electrodes may comprise 0.5 to 9.5 by weight of binder(s) (C), referring to the sum of component (A), carbon (B) and binder (C).

A further aspect of the present invention is a battery, containing (1) at least one cathode comprising inventive material (A), carbon (B), and binder (C),
(2) at least one anode, and
(3) at least one electrolyte.

Embodiments of cathode (1) have been described above in detail.

Anode (2) may contain at least one anode active material, such as carbon (graphite), $TiO_2$, lithium titanium oxide, silicon or tin. Anode (2) may additionally contain a current collector, for example a metal foil such as a copper foil.

Electrolyte (3) may comprise at least one non-aqueous solvent, at least one electrolyte salt and, optionally, additives.

Non-aqueous solvents for electrolyte (3) can be liquid or solid at room temperature and is preferably selected from among polymers, cyclic or acyclic ethers, cyclic and acyclic acetals and cyclic or acyclic organic carbonates.

Examples of suitable polymers are, in particular, polyalkylene glycols, preferably poly-$C_1$-$C_4$-alkylene glycols and in particular polyethylene glycols. Polyethylene glycols can here comprise up to 20 mol % of one or more $C_1$-$C_4$-alkylene glycols. Polyalkylene glycols are preferably polyalkylene glycols having two methyl or ethyl end caps.

The molecular weight $M_w$ of suitable polyalkylene glycols and in particular suitable polyethylene glycols can be at least 400 g/mol.

The molecular weight $M_w$ of suitable polyalkylene glycols and in particular suitable polyethylene glycols can be up to 5,000,000 g/mol, preferably up to 2,000,000 g/mol.

Examples of suitable acyclic ethers are, for example, diisopropyl ether, di-n-butyl ether, 1,2-dimethoxyethane, 1,2-diethoxyethane, with preference being given to 1,2-dimethoxyethane.

Examples of suitable cyclic ethers are tetrahydrofuran and 1,4-dioxane.

Examples of suitable acyclic acetals are, for example, dimethoxymethane, diethoxymethane, 1,1-dimethoxyethane and 1,1-diethoxyethane.

Examples of suitable cyclic acetals are 1,3-dioxane and in particular 1,3-dioxolane.

Examples of suitable acyclic organic carbonates are dimethyl carbonate, ethyl methyl carbonate and diethyl carbonate.

Examples of suitable cyclic organic carbonates are compounds of the general formulae (II) and (III)

(II)

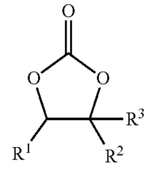

-continued (III)

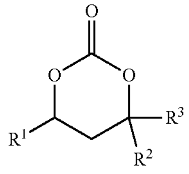

where $R^1$, $R^2$ and $R^3$ can be identical or different and are selected from among hydrogen and $C_1$-$C_4$-alkyl, for example methyl, ethyl, n-propyl, isopropyl, n-butyl, isobutyl, sec-butyl and tert-butyl, with $R^2$ and $R^3$ preferably not both being tert-butyl.

In particularly preferred embodiments, $R^1$ is methyl and $R^2$ and $R^3$ are each hydrogen, or $R^1$, $R^2$ and $R^3$ are each hydrogen.

Another preferred cyclic organic carbonate is vinylene carbonate, formula (IV).

(IV)

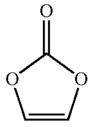

The solvent or solvents is/are preferably used in the water-free state, i.e. with a water content in the range from 1 ppm to 0.1% by weight, which can be determined, for example, by Karl-Fischer titration.

Electrolyte (3) further comprises at least one electrolyte salt. Suitable electrolyte salts are, in particular, lithium salts. Examples of suitable lithium salts are $LiPF_6$, $LiBF_4$, $LiClO_4$, $LiAsF_6$, $LiCF_3SO_3$, $LiC(C_nF_{2n+1}SO_2)_3$, lithium imides such as $LiN(C_nF_{2n+1}SO_2)_2$, where n is an integer in the range from 1 to 20, $LiN(SO_2F)_2$, $Li_2SiF_6$, $LiSbF_6$, $LiAlCl_4$ and salts of the general formula $(C_nF_{2n+1}SO_2)_tYLi$, where m is defined as follows:

- t=1, when Y is selected from among oxygen and sulfur,
- t=2, when Y is selected from among nitrogen and phosphorus, and
- t=3, when Y is selected from among carbon and silicon.

Preferred electrolyte salts are selected from among $LiC(CF_3SO_2)_3$, $LiN(CF_3SO_2)_2$, $LiPF_6$, $LiBF_4$, $LiClO_4$, with particular preference being given to $LiPF_6$ and $LiN(CF_3SO_2)_2$.

In a preferred embodiment of the present invention, electrolyte (3) contains at least one flame retardant. Useful flame retardants may be selected from trialkyl phosphates, said alkyl being different or identical, triaryl phosphates, alkyl dialkyl phosphonates, and halogenated trialkyl phosphates. Preferred are tri-$C_1$-$C_4$-alkyl phosphates, said $C_1$-$C_4$-alkyls being different or identical, tribenzyl phosphate, triphenyl phosphate, $C_1$-$C_4$-alkyl di-$C_1$-$C_4$-alkyl phosphonates, and fluorinated tri-$C_1$-$C_4$-alkyl phosphates, In a preferred embodiment, electrolyte (3) comprises at least one flame retardant selected from trimethyl phosphate, $CH_3$—$P(O)(OCH_3)_2$, triphenylphosphate, and tris-(2,2,2-trifluoroethyl)-phosphate.

Electrolyte (3) may contain 1 to 10% by weight of flame retardant, based on the total amount of electrolyte.

In an embodiment of the present invention, batteries according to the invention comprise one or more separators (4) by means of which the electrodes are mechanically separated. Suitable separators (4) are polymer films, in particular porous polymer films, which are unreactive toward metallic lithium. Particularly suitable materials for separators (4) are polyolefins, in particular film-forming porous polyethylene and film-forming porous polypropylene.

Separators (4) composed of polyolefin, in particular polyethylene or polypropylene, can have a porosity in the range from 35 to 50%. Suitable pore diameters are, for example, in the range from 30 to 500 nm.

In another embodiment of the present invention, separators (4) can be selected from among PET nonwovens filled with inorganic particles. Such separators can have a porosity in the range from 40 to 55%. Suitable pore diameters are, for example, in the range from 80 to 750 nm.

Batteries according to the invention can further comprise a housing which can have any shape, for example cuboidal or the shape of a cylindrical disk. In one variant, a metal foil configured as a pouch is used as housing.

Batteries according to the invention provide a very good discharge and cycling behavior, in particular at high temperatures (45 °C or higher, for example up to 60 °C) in particular with respect to the capacity loss.

Batteries according to the invention can comprise two or more electrochemical cells that combined with one another, for example can be connected in series or connected in parallel. Connection in series is preferred. In batteries according to the present invention, at least one of the electrochemical cells contains at least one electrode according to the invention. Preferably, in electrochemical cells according to the present invention, the majority of the electrochemical cells contain an electrode according to the present invention. Even more preferably, in batteries according to the present invention all the electrochemical cells contain electrodes according to the present invention.

The present invention further provides for the use of batteries according to the invention in appliances, in particular in mobile appliances. Examples of mobile appliances are vehicles, for example automobiles, bicycles, aircraft or water vehicles such as boats or ships. Other examples of mobile appliances are those which move manually, for example computers, especially laptops, telephones or electric hand tools, for example in the building sector, especially drills, battery-powered screwdrivers or battery-powered staplers.

The present invention is further illustrated by working examples.

General remarks: Percentages are percent by weight unless specifically noted otherwise.

ICP: inductively couple plasma

For comparative examples of step (c), under 100% $O_2$ and 21% $O_2$, a cylinder with the appropriate mixture of $O_2$ and argon (if applicable) was utilized.

For inventive examples of step (c), under 1% $O_2$ and 0.1% $O_2$, a mixture of the appropriate volume by simultaneously flowing 21% $O_2$ in argon with pure argon from premixed cylinders, with the flow rate for each controlled to achieve the desired partial pressure of oxygen.

PVdF: polyvinylidene fluoride

The specific surface (BET) was determined according to DIN-ISO 9277:2003-05.

I. Manufacture of a Precursor TM-OH.1, Step (a.1)

A stirred tank reactor was filled with deionized water and tempered to 45 °C. Then, the pH value was adjusted to 11.3 by adding an aqueous sodium hydroxide solution.

The co-precipitation reaction was started by simultaneously feeding an aqueous transition metal sulfate solution and aqueous sodium hydroxide solution at a flow rate ratio of 1.9, and a total flow rate resulting in an average residence time of 12 hours. The transition metal solution contained Ni and Mn at a molar ratio of 1:2 and a total transition metal concentration of 1.65 mol/kg. The aqueous sodium hydroxide solution was a 50 wt. % sodium hydroxide solution. The pH value was kept at 11.3 by the separate feed of the aqueous sodium hydroxide solution. Beginning with the start-up of all feeds, mother liquor was removed continuously. After 29 hours all feed flows were stopped. The mixed transition metal (TM) oxyhydroxide precursor was obtained by filtration of the resulting suspension, washing with distilled water, drying at 120 °C in air and sieving. A precursor TM-OH.1 was obtained, average particle diameter (D50) 6 μm.

II. Addition of Source of Lithium, Step (b)

Step (b.1): Precursor TM-OH.1 was mixed with $Li_2CO_3$ at a mass ratio of 0.5542 g $Li_2CO_3$: 1 g TM-OH.1 so the Li:TM ratio was 1.14:0.86. The mixture was ground in a planetary ball mill at 120 rpm for 30 minutes. A powdery mixture was obtained.

III. Thermal Treatment

III.1 Synthesis of Inventive Cathode Active Material CAM.1, Step (c.1)

Thermal treatment, step (c.1): The thermal treatment of the mixture obtained in step (b.1) was heated in a tube furnace in accordance with the following temperature profile: ramp at 1.5 °C/minute to 900 °C, hold at 900 °C for five hours, followed by natural cooling. The oxygen content of the mixed gas was continually monitored with an oxygen sensor during step (c.1), and maintained at the desired level. The oxygen content of the atmosphere in step (c.1) was 0.1 vol %. Inventive CAM.1 was obtained.

III.2 Synthesis of Inventive Cathode Active Material CAM.2, step (c.2)

Step (c.1) was repeated but the oxygen content of the atmosphere in step (c.1) was 1.0 vol-%. Inventive CAM.2 was obtained.

III.3 Synthesis of Comparative Cathode Active Material C-CAM.3, step c-(c.3)

Step (c.1) was repeated but the oxygen content of the atmosphere in step c-(c.3) was 21.0 vol-%. Comparative material C-CAM.3 was obtained.

III.4 Synthesis of Comparative Cathode Active Material C-CAM.4, step c-(c.4)

Step (c.1) was repeated but the oxygen content of the atmosphere in step c-(c.4) was 100 vol-%. Comparative material C-CAM.4 was obtained.

IV. Electrode testing

IV.1 Manufacture of Inventive Electrodes by Sheet Coating

For each electrode sheet, a slurry of inventive or comparative cathode active material, PVdF, and carbon black was mixed in an 80:10:10 mass ratio in NMP, with an NMP to cathode active material ratio of 2.9 mL:1 g. The resultant slurry was centrifugally mixed for 10 minutes, then immediately coated onto carbon-coated aluminum foil via a doctor blade set to a 100 micron gap. The electrode sheet was dried at 65 °C for four hours, then transferred to a vacuum oven set to 60 °C and dried for 12 hours, then transferred to an argon-filled glovebox.

IV.2 Cell Assembly

For each cell, a disc of ~1 cm diameter was punched and massed to determine the loading of active material for that particular cell. Electrochemical testing was carried out in half-cells of coin cell geometry consisting of a massed cathode disk, Celgard separator (PP-PE-PP trilayer), and lithium foil anode, all flooded with 1 M $LiPF_6$ in 1:1 by vol. ethylene carbonate:diethyl carbonate. The freshly assembled cells were allowed to rest for a minimum of three hours prior to electrochemical testing. The results are summarized in Table 1.

Rates are calculated on a basis of 1 C=250 mA/g. Capacities provided were discharge capacities for cells charged at 0.5 C from 2 V to 4.7 V, held at 4.7 V until a current of 0.02 C was reached, then discharged at the given rate to 2 V.

TABLE 1

Specific Surface (BET) and results of electrochemical testings, expressed as capacities

| | CAM | | | |
|---|---|---|---|---|
| | C-CAM.4 | C-CAM.3 | CAM.2 | CAM.1 |
| BET [$m^2$/g] | n.d. | 1.56 | 3.55 | n.d. |
| 0.1 C | 198.6 | 196.1 | 244.6 | 240.6 |
| 0.2 C | 186.2 | 184.6 | 237.9 | 233.5 |
| 0.5 C | 164.6 | 161.9 | 223.4 | 220.1 |
| 1 C | 142.6 | 139.2 | 205.4 | 203.8 |
| 2 C | 112.6 | 109.6 | 177.5 | 177.5 |
| 3 C | 89.01 | 86.7 | 151.2 | 153.5 |

All capacities are expressed in mA · h/g
n.d.: not determined
The pressed densities of CAM.1 and CAM.2 were in the claimed range.

The invention claimed is:

1. A particulate material of a composition $Li_{1+x}TM_{1-x}O_2$ wherein x ranges from 0.1 to 0.2 and TM is a combination of elements according to general formula (I)

$$(Ni_aCo_bMn_c)_{1-d}M^1_d \quad (I)$$

wherein
a ranges from 0.30 to 0.38,
b ranges from zero to 0.05,
c ranges from 0.60 to 0.70, and
d ranges from zero to 0.05,
$M^1$ is selected from Al, Ti, Zr, W, Mo, Mg, Nb, Ta, and combinations of at least two of the foregoing,
a+b+c=1,
wherein the particulate material has an average particle diameter D50 ranging from 2 μm to 20 μm, a specific surface area (BET) ranging from 0.7 $m^2$/g to 3.8 $m^2$/g,
and wherein the particulate material has a pressed density ranging from 2.75 to 3.1 g/$cm^3$.

2. The particulate material according to claim 1, wherein $M^1$ is Al and b is zero.

3. The particulate material according to claim 1, wherein the specific surface area ranges from 1.5 $m^2$/g to 3.8 $m^2$/g.

4. A cathode comprising:
(A) at least one cathode active material according to claim 1,
(B) carbon in electrically conductive form, and
(C) at least one binder.

5. An electrochemical cell comprising a cathode according to claim 4.

* * * * *